United States Patent
Yeakley et al.

(10) Patent No.: US 7,948,715 B2
(45) Date of Patent: May 24, 2011

(54) HEAD POSITIONING ASSEMBLY

(75) Inventors: Darryl W. Yeakley, Erie, CO (US);
Matthew K. Tucker, Boulder, CO (US);
Steven G. Suttle, Broomfield, CO (US)

(73) Assignee: Oracle America, Inc., Redwood City, CA (US)

( * ) Notice: Subject to any disclaimer, the term of this patent is extended or adjusted under 35 U.S.C. 154(b) by 872 days.

(21) Appl. No.: 11/934,473

(22) Filed: Nov. 2, 2007

(65) Prior Publication Data
US 2009/0116135 A1    May 7, 2009

(51) Int. Cl.
*G11B 15/62*    (2006.01)
(52) U.S. Cl. .................................................. 360/261.1
(58) Field of Classification Search ................ 360/261.1
See application file for complete search history.

(56) References Cited

U.S. PATENT DOCUMENTS

| | | | | |
|---|---|---|---|---|
| 5,519,554 A | * | 5/1996 | Todd et al. | 360/266.5 |
| 5,793,573 A | * | 8/1998 | Eckberg et al. | 360/261.3 |
| 5,949,619 A | * | 9/1999 | Eckberg et al. | 360/291 |
| 6,078,483 A | * | 6/2000 | Anderson | 360/261.1 |
| 6,388,836 B2 | * | 5/2002 | Anderson et al. | 360/128 |
| 6,404,598 B1 | * | 6/2002 | Nayak et al. | 360/291 |
| 7,218,480 B1 | | 5/2007 | Yeakley et al. | |
| 7,542,234 B1 | * | 6/2009 | Goodknight et al. | 360/130.21 |
| 2001/0012178 A1 | * | 8/2001 | Anderson et al. | 360/128 |
| 2007/0058298 A1 | * | 3/2007 | Harper et al. | 360/261.1 |

OTHER PUBLICATIONS

U.S. Appl. No. 11/733,812, Yeakley et al.
U.S. Appl. No. 11/733,814, Yeakley et al.
U.S. Appl. No. 11/242,748, Yeakley et al.

* cited by examiner

*Primary Examiner* — Mark Blouin
(74) *Attorney, Agent, or Firm* — Brooks Kushman P.C.

(57) ABSTRACT

A head positioning assembly having a first carriage assembly, a second carriage assembly, and an actuator. The second carriage assembly has a head and is coupled to the first carriage assembly by a first flexible member. The first and second carriage assemblies may be actuated to position the head when sufficient force is provided by the actuator.

20 Claims, 4 Drawing Sheets

HEAD POSITIONING ASSEMBLY

BACKGROUND OF THE INVENTION

1. Field of the Invention

The present invention relates to an assembly for positioning a head for communication with a media.

SUMMARY OF THE INVENTION

In at least one embodiment of the present invention, a head positioning assembly is provided. The head positioning assembly includes a first carriage assembly, a second carriage assembly, and an actuator. The second carriage assembly has a head and is coupled to the first carriage assembly by a first flexible member. The first and second carriage assemblies are actuated to position the head when sufficient force is provided by the actuator.

In at least one other embodiment of the present invention, a head positioning assembly is provided. The head positioning assembly includes a first carriage assembly, a second carriage assembly, an actuator, and a first flexible member. The first carriage assembly is moveable in a first direction. The second carriage assembly is moveable in the first direction and has a head. The actuator is coupled to the second carriage assembly. The first flexible member couples the first carriage assembly to the second carriage assembly. The first flexible member inhibits movement of the first carriage assembly from high frequency actuation provided by the actuator.

In at least one other embodiment of the present invention, a head positioning assembly is provided that includes a base, first and second carriage assemblies, and first and second flexible members. The first carriage assembly is moveably disposed on the base. The second carriage assembly includes a recording head. The first and second flexible members are spaced apart from each other and extend from first carriage assembly to the second carriage assembly. The first and second flexible members permit the second carriage assembly to move independent of the first carriage assembly. The first carriage assembly moves in response to sufficient displacement of the second carriage assembly.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
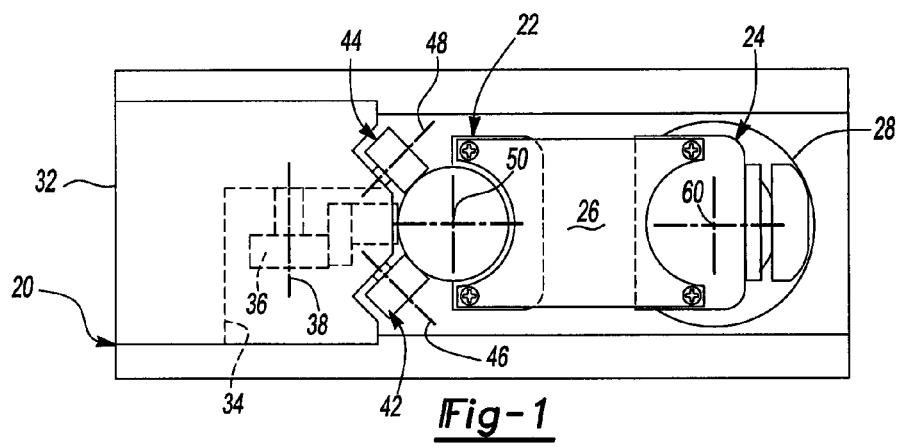
FIG. 1 is a top section view of a head positioning assembly along section line 1-1 shown in FIG. 2.
Figure 2:
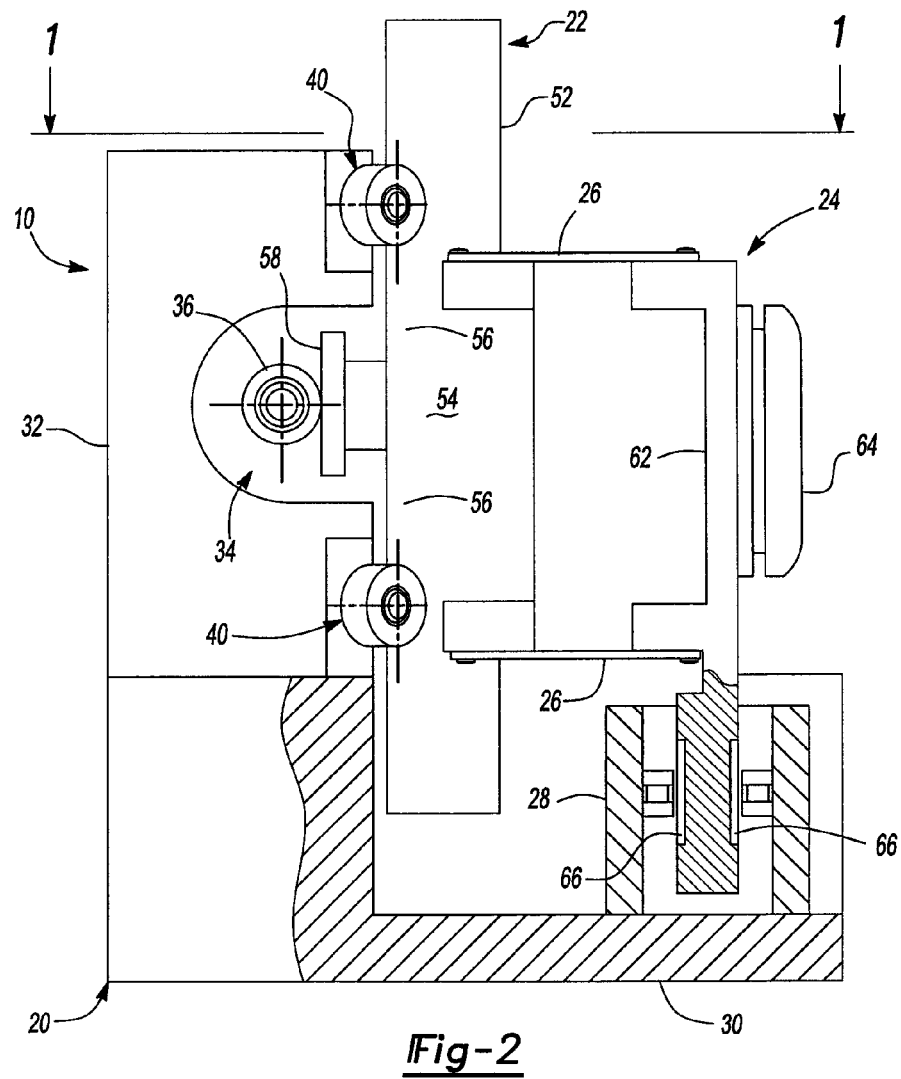
FIG. 2 is a fragmentary side view of the head positioning assembly.

Referring to FIGS. 1 and 2, an exemplary assembly 10 for positioning a head for communication with a media is shown. The assembly 10 may be provided as part of a data storage and/or retrieval system that may be adapted to communicate data with any suitable media, such as a tape (e.g, optical or magnetic tape) or disc (e.g., optical or magnetic disc).

The assembly 10 may include a plurality of components that facilitate positioning of a head relative to the media. In the exemplary embodiment shown in FIGS. 1 and 2, the assembly 10 includes a base 20, a first carriage assembly 22, a second carriage assembly 24, one or more flexible members or flexures 26, and an actuator 28.

The base 20 may provide a structure that facilitates precise positioning of a head. For instance, the base 20 may receive or facilitate mounting of various components associated with the positioning of the head. The base 20 may be made of any suitable material, such as a metal or polymeric material that provides sufficient stability and/or resistance to flexing and deformation. The base 20 may have any suitable configuration. In at least one exemplary embodiment, such as is shown in FIG. 2, the base 20 may have a generally L-shaped configuration that includes a first portion 30 and a second portion 32.

The first portion 30 may be disposed at an angle relative to the second portion 32. In at least one embodiment, the first portion 30 may be spaced apart from the first and second carriage assemblies 22,24 and may provide a mounting surface for the actuator 28.

The second portion 32 may receive at least a portion of the first carriage assembly 22 and include one or more bearings as discussed below. For example, the second portion 32 may include a channel 34 into which the first carriage assembly 22 may at least partially extend. The channel 34 may extend at least partially through the base 20 in one or more embodiments of the present invention.

An anti-rotation bearing 36 may be disposed in the channel 34 and may engage the first carriage assembly 22 to help control and/or inhibit movement of the first carriage assembly 22 relative to the base 20. As such, the anti-rotation bearing helps control movement of the first carriage assembly 22 and thus movement of the second carriage assembly 24 and its head when the first carriage assembly 22 is displaced. In at least one embodiment, the anti-rotation bearing 36 may have an axis of rotation 38 that is disposed generally perpendicular to a direction of travel of the first carriage assembly 22. The anti-rotation bearing 36 may be of any suitable type, such as a roller bearing.

The second portion 32 may also include a guide system that facilitates and guides movement of the first carriage assembly 22 relative to the base 20. The guide system may have any suitable configuration. For example, the guide system may be configured as a slide or may include a set of bearings 40, such as roller bearings, that engage and facilitate movement of the first carriage assembly 22. The set of bearings 40 may have one or more members and may be positioned in any suitable manner. For instance, first and second bearings 42,44 may be disposed on the base 20 and rotate about first and second axes of rotation 46,48, respectively. The first and second axes of rotation 46,48 may be disposed along intersecting planes to help inhibit movement of the first carriage assembly 22 in multiple directions while permitting movement in at least one direction. In the embodiment shown, first and second bearings 42,44 are oriented along generally perpendicular axes of rotation and are provided in pairs that are spaced apart from each other to support the first carriage assembly 22 throughout its range of motion.

The first carriage assembly 22 may be moveably disposed on the base 20. For instance, the first carriage assembly 22 may be configured to move along a first travel axis 50 to provide course adjustments to the position of a head as will be discussed in more detail below. Coarse adjustments may create a large displacement of a head, such as may be associated with movement between tracks on the media. The first carriage assembly 22 may be configured to provide a greater range of movement than the second carriage assembly 24. For example, the first carriage assembly 22 may be configured to move about ±2.5 mm in at least one embodiment of the present invention. In at least one embodiment, the first carriage assembly 22 may include a body portion 52 and a middle portion 54.

The body portion 52 may engage one or more members of the set of bearings 40. Optionally, the body portion 52 may include one or more flats that may provide increased surface area for contact with one or more members of the set of bearings 40. Alternatively, the position of the shaft and associated bearings may be reversed in one or more embodiments of the present invention. For example, one or more bearings may be provided on the first carriage assembly 22. Clearance may be provided between the body portion 52 and the first and second portions 30,32 of the base 20 to facilitate travel along the first travel axis 50. For example, the body portion 52 may be generally spaced apart from the second portion 32 of the base 20 to permit movement toward or away from the first portion 30 of the base 20.

The middle portion 54 may be mounted to or formed integrally with the body portion 52 in one or more embodiments of the present invention. In addition, the middle portion 54 may generally be disposed between members of the set of bearings 40. The middle portion 54 may at least partially extend into the channel 34 and may include a magnetic preload system 58 that helps provide a force to bias or load the first carriage assembly 22 against the anti-rotation bearing 36 and/or one or more members of the set of bearings 40. For example, the magnetic preload system 58 may include a magnet or electromagnet that provides a magnetic force that is attracted to the anti-rotation bearing 36. The middle portion 54 may also contact part of the base 20, such as a surface of the channel 34, when sufficiently displaced, thereby limiting the range of motion of the first carriage assembly 22 along the first travel axis 50.

The second carriage assembly 24 may be moveable with respect to the base 20 and/or the first carriage assembly 22. For instance, the second carriage assembly 24 may be configured to move along a second travel axis 60 to provide fine adjustments to the position of a head as will be discussed in more detail below. The second carriage assembly 24 may be configured to provide a smaller range of movement than the first carriage assembly 22. For example, the second carriage assembly 24 may be configured to move about ±50 microns in at least one embodiment of the present invention. In at least one embodiment, the second carriage assembly 24 may include a support portion 62 and a head 64.

The support portion 62 may be associated with the actuator 28. For instance, support portion 62 may extend from or be coupled to the actuator 28. In at least one embodiment, the support portion 62 may include one or more magnets 66 that may respond to force exerted by the actuator 28. For example, the magnets 66 may be attracted or repelled by the actuator 28, which may result in movement of the second carriage assembly 24.

The head 64 may be fixedly positioned on or with respect to the support portion 62. The head 64 may facilitate one-way or two-way data communication with a media. For example, the head 64 may transmit and/or receive a signal representative of data. In at least one embodiment, the head 64 may be a recording head that is adapted to record data on media such as a tape.

One or more flexures 26 or flexible members may moveably couple the first and second carriage assemblies 22,24. In the embodiment shown, two flexures 26 are provided that are spaced apart from each other and extend between the middle portion 54 of the first carriage assembly 22 and the support portion 62 of the second carriage assembly 24. The flexures 26 may have any suitable configuration that provides a desired response to force exerted by the actuator 28. In at least one embodiment, the flexures 26 may have a generally planar configuration. The flexures 26 may be coupled to the first and second carriage assemblies 22,24 in any suitable manner, such as with an adhesive, fastener, and/or by forming or overmolding a portion of the first and second carriage assemblies 22,24 over a portion of a flexure 26. The flexures 26 help provide actuation frequency segregation between the first and second carriage assemblies 22,24 as will be discussed in more detail below.

The actuator 28 may provide force that facilitates or controls movement of the head 64. The actuator 28 may be of any suitable type that provides sufficient responsiveness and positioning accuracy to meet design specifications. For example, the actuator 28 may be an electrical machine, such as an electric motor, that attracts or repels a portion of the second carriage assembly 24, such as a magnet 66.

A control system may be used to control operation of the actuator 28. For example, the control system may utilize a position error signal indicative of an amount of error between actual and target positions of the head 64. The target position may be a indicative of a desired position of the head 64 relative to the media. The position error signal may be used to adjust the current provided to the actuator 28 to provide an appropriate corrective response, which may result in movement of at least one of the first and second carriage assemblies 22,24.

Exemplary operation of the assembly 10 will now be described in greater detail. The actuator 28 may be configured to move the first and second carriage assemblies 22,24 to move the head 64 to a desired location. As such, the first and second carriage assemblies 22,24 may be actuated without separate actuators or motors.

Figure 3:
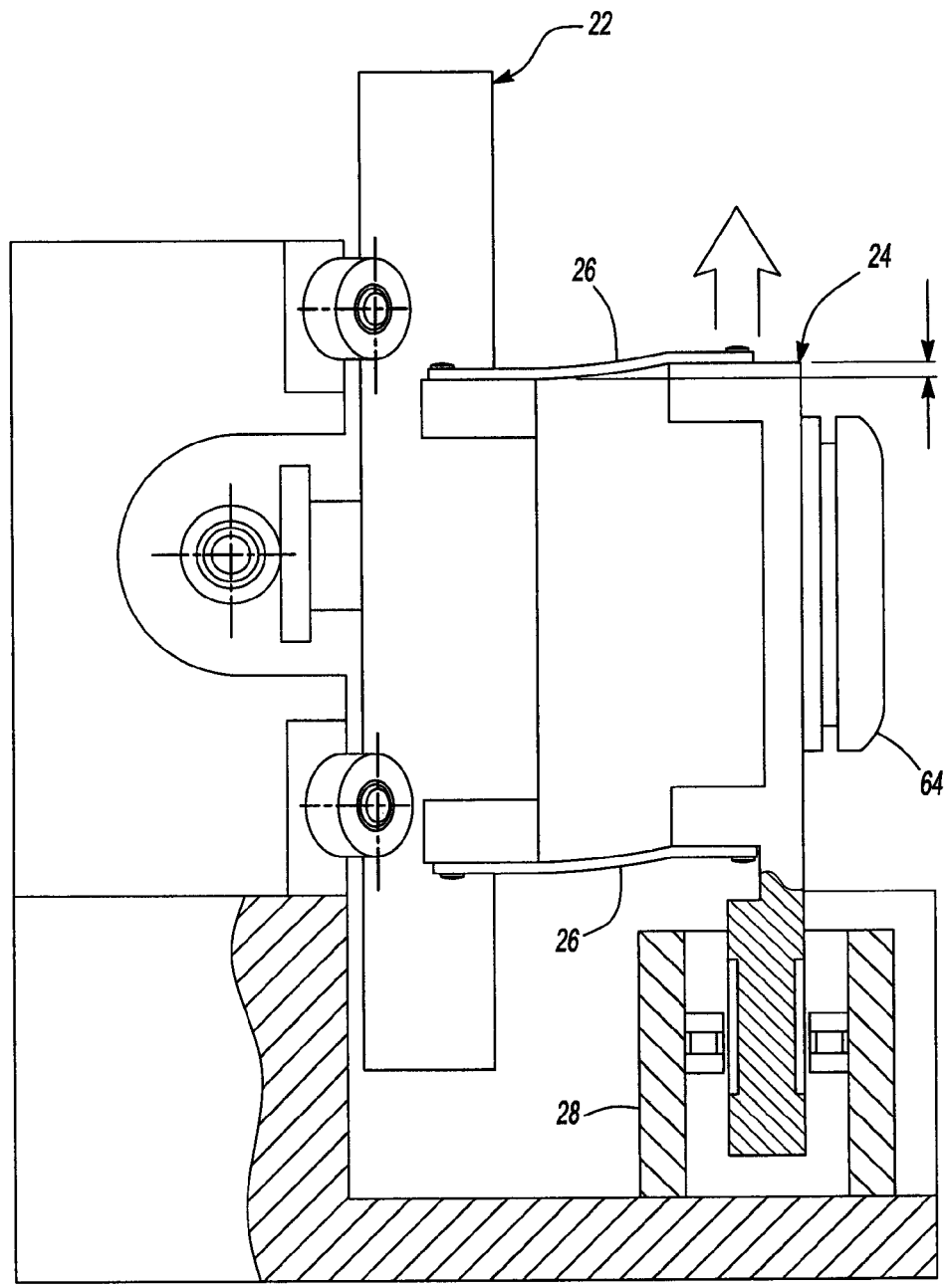
FIG. 3 is a fragmentary side view of the head positioning assembly illustrating movement of a second carriage assembly.
Figure 4:
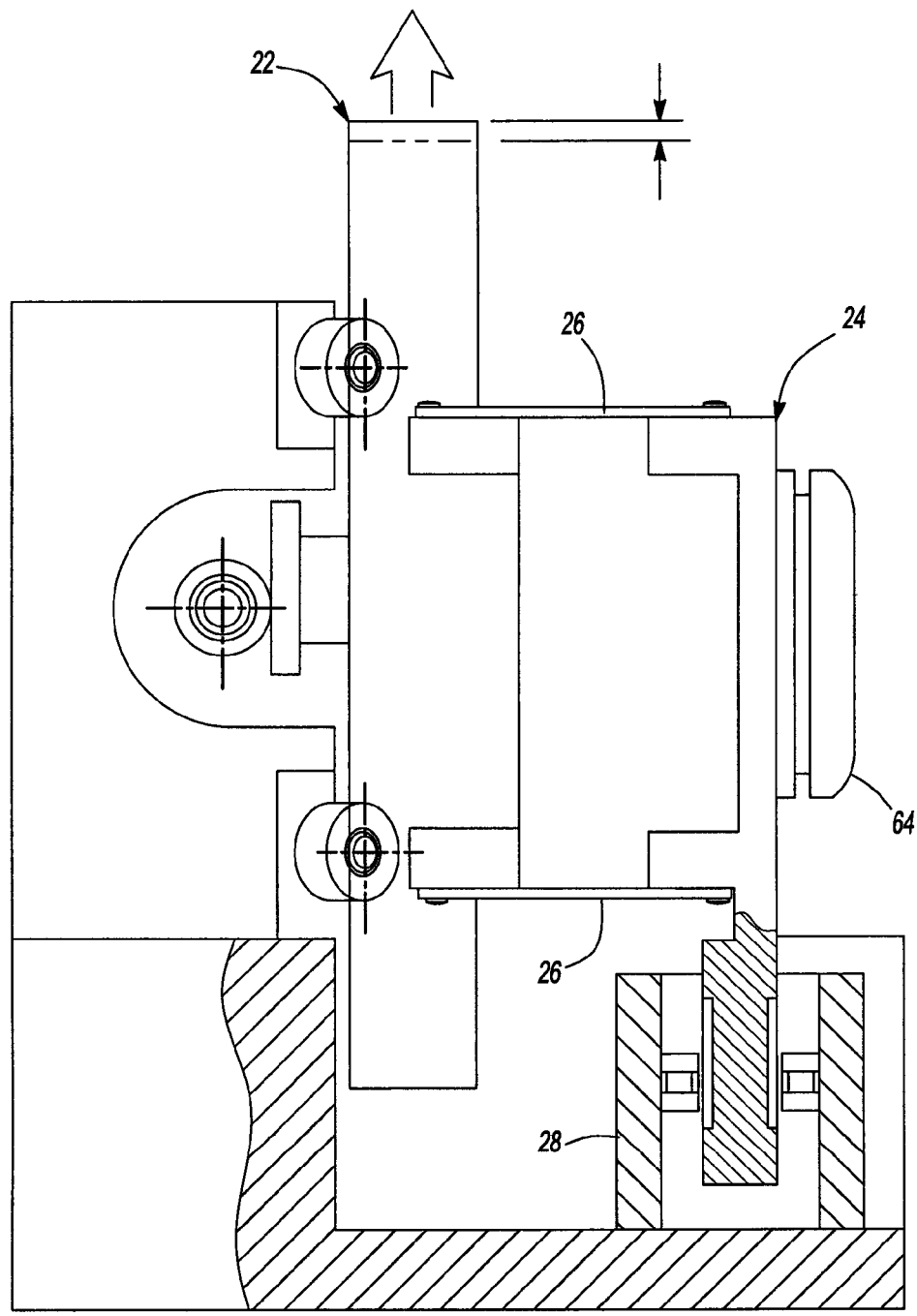
FIG. 4 is a section view of the head positioning assembly illustrating movement of a first carriage assembly.

An exemplary graphical representation of movement of the first and second carriage assemblies 22,24 is shown in FIGS. 2-4. In FIGS. 2-4, movement is shown in one direction for clarity; however the direction of motion could be changed or reversed.

In FIG. 2, the first and second carriage assemblies 22,24 are shown in an exemplary initial position in which the first and second carriage assemblies 22,24 are not in motion relative to each other. Such an initial position may exist when a bending moment has not been imparted to the flexures 26.

In response to a sufficient input force exerted by the actuator 28, the second carriage assembly 24 may be moved along the second travel axis 60 as is shown in FIG. 3. In FIG. 3, the second carriage assembly 24 is shown displaced away from the actuator 28 in response to the input force, resulting in bending or flexing of the flexures 26.

If the input force has a high enough frequency, then the second carriage assembly 24 may move while the first carriage assembly 22 remains stationary. This independent movement may be facilitated by the flexures 26, which help isolate the first carriage assembly 22 from the excitation force of the second carriage assembly 24. As such, the flexures 26 may provide vibration isolation between the first and second carriage assemblies 22,24. This vibration isolation effect is due to the relationship between the natural frequencies of the first and second carriage assemblies 22,24, the actuator excitation frequency and the stiffness of the flexures 26.

If the input force has a low enough frequency, then the flexures 26 may not provide an isolation effect that completely inhibits motion of the first carriage assembly 22. In this case, the first and second carriage assemblies 22,24 move together. This is graphically represented in FIG. 4, which shows the first carriage assembly 22 displaced from its initial position along the first travel axis. The displacement of the first carriage assembly 22 may result from the transfer of force through the flexures 26. In at least one exemplary embodiment, low frequency excitation may occur below approximately 200 Hz.

Although FIGS. 2-4 appear to represent independent motion of the first and second carriage assemblies 22,24, actuation of the first and second carriage assemblies 22,24 may occur simultaneously and in response to different actuation frequencies. For instance, the second carriage assembly 24 may be configured to move in response to higher frequency excitation than the first carriage assembly 22. In at least one exemplary embodiment, higher frequency excitation may occur above approximately 200 Hz. The different frequency responses may be facilitated by isolation provided by the flexures 26. Moreover, the flexures 26 may help isolate movement of the first carriage assembly 22 in response to high frequency actuation provided by the actuator 28 to the second carriage assembly 24. As such, the flexures 26 may allow the second carriage assembly 24 to be actuated by higher frequency inputs or vibrations than the first carriage assembly 22.

Figure 5:
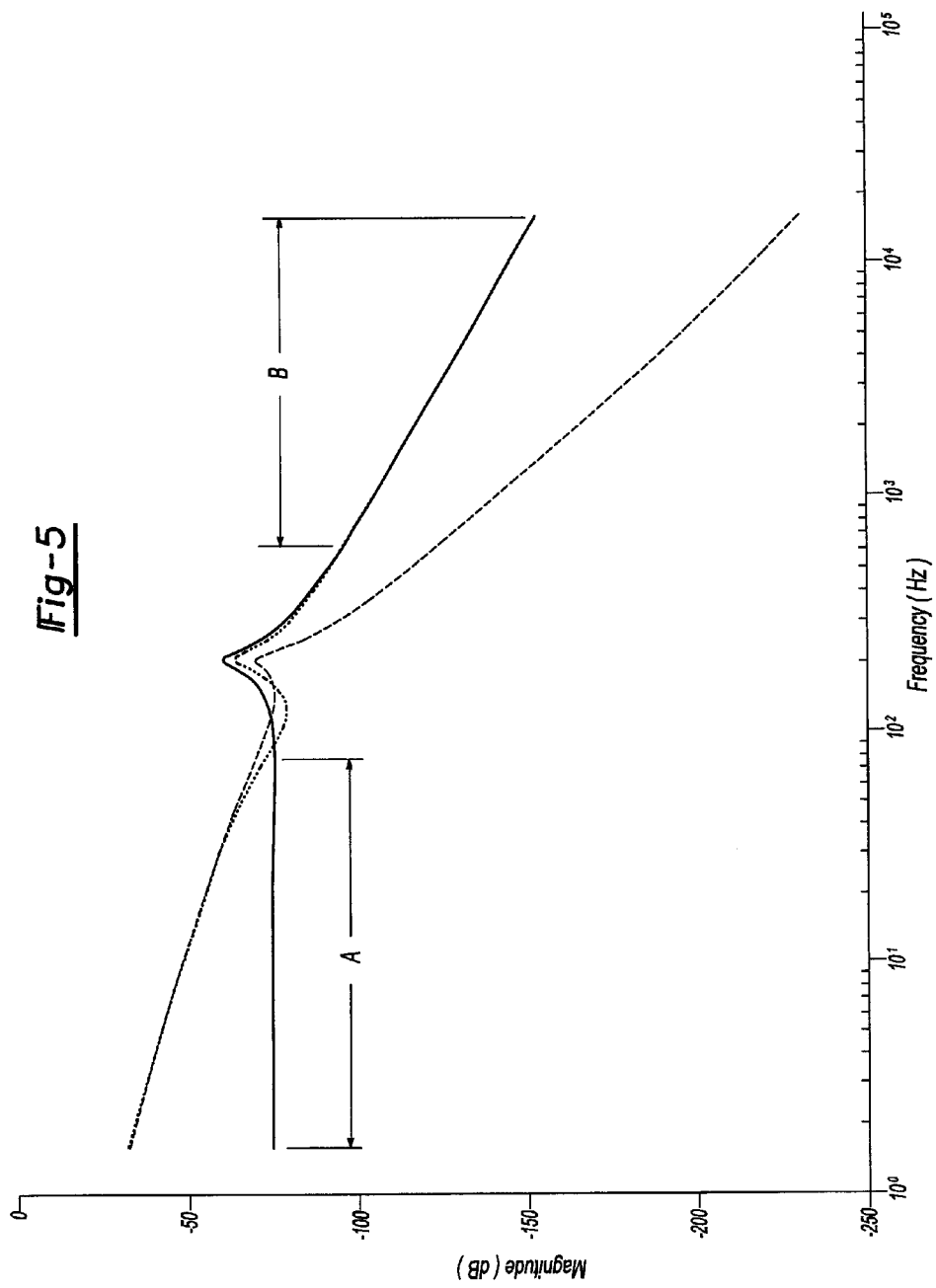
FIG. 5 is a plot illustrating the theoretical magnitude of displacement gain of the first and second carriage assemblies in response to different excitation frequencies.

Referring to FIG. 5, an exemplary plot of the theoretical responsiveness of the first and second carriage assemblies 22,24 to different actuation frequencies is shown. The response of the first carriage assembly 22 is represented by the dashed line. The response of the second carriage assembly 24 is represented by the dotted line. The response of the second carriage assembly 24 relative to the first carriage assembly 22 is represented by the solid line. Magnitude of displacement gain is plotted along the vertical axis while frequency is plotted logarithmically along the horizontal axis.

At low frequencies (e.g., toward the left side of the plot highlighted by line A) the first carriage assembly 22 accounts for most of the displacement as compared to the relative displacement of the second carriage assembly 24. This relationship is represented by the dashed line having a much greater magnitude than the horizontal solid line at low frequencies. At low frequencies the first carriage assembly 22 and the second carriage assembly 24 move together. At high frequencies (e.g., toward the right side of the plot highlighted by line B) the second carriage assembly 24 accounts for most displacement, as is represented by the drop in the displacement magnitude of the first carriage assembly 22 and the alignment or overlap of the relative displacement line (solid line) and the displacement of the second carriage assembly 24 (dotted line).

The present invention may allow a head positioning assembly to be provided without separate actuators or motors for coarse and fine adjustments, thereby reducing cost and complexity, simplifying control systems, and/or improving reliability. In addition, the present invention may allow a head positioning assembly to be provided without a detent mechanism for coarse adjustments (e.g., mechanical shifting between two specific track positions), thereby reducing cost, complexity, and enabling simultaneous coarse and fine positioning adjustments. Moreover, in at least one embodiment, the present invention may provide an assembly that benefits from bearing based adjustments, which may be better suited for large displacements, as well as flexure based adjustments, which may be better suited for fine adjustments. Also, the combination of bearing and flexure based adjustments may reduce out of plane resonances and rotational movement that may be associated with a pure flexure system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A head positioning assembly comprising:
 a first carriage assembly;
 a second carriage assembly coupled to the first carriage assembly by a first flexible member, the second carriage assembly having a head; and
 an actuator directly coupled to the second carriage assembly;
 wherein the first and second carriage assemblies are simultaneously excited by actuator to move the head.

2. The head positioning assembly of claim 1 further comprising a second flexible member that is spaced apart from the first flexible member and couples the first carriage assembly to the second carriage assembly.

3. The head positioning assembly of claim 1 further comprising a base and a set of bearings disposed on the base, wherein the first carriage assembly is moveably disposed on the set of bearings.

4. The head positioning assembly of claim 1 further comprising a base having an anti-rotation bearing and a magnetic preload system that biases the first carriage assembly against the anti-rotation bearing.

5. The head positioning assembly of claim 1 wherein the first carriage assembly is configured to provide greater displacement of the head than the second carriage assembly.

6. The head positioning assembly of claim 1 further comprising a base having a channel and an anti-rotation bearing disposed in the channel that engages the first carriage assembly.

7. The head positioning assembly of claim 1 further comprising a base having a channel, wherein movement of the first carriage assembly is inhibited when the first carriage assembly contacts a surface of the channel.

8. A head positioning assembly comprising:
 a first carriage assembly moveable in a first direction;
 a second carriage assembly moveable in the first direction and having a head;
 an actuator that engages the second carriage assembly; and
 a first flexible member that couples the first carriage assembly to the second carriage assembly;
 wherein the first flexible member inhibits movement of the first carriage assembly in response to high frequency actuation provided by the actuator.

9. The head positioning assembly of claim 8 wherein the second carriage assembly moves relative to the first carriage assembly in response to high frequency actuation provided by the actuator.

10. The head positioning assembly of claim 8 wherein the first flexible member helps isolate vibrations between the first carriage assembly and the second carriage assembly such that the second carriage assembly is actuated by higher frequency vibrations than the first carriage assembly.

11. The head positioning assembly of claim 8 wherein the first carriage assembly is moveable along a first axis and the second carriage assembly is moveable along a second axis disposed parallel to the first axis.

12. The head positioning assembly of claim 11 wherein a range of movement of the first carriage assembly along the first axis is greater than a range of movement of the second carriage assembly along the second axis such that the first carriage provides coarse adjustments to the position of the head and the second carriage assembly provides fine adjustments to the position of the head.

13. The head positioning assembly of claim 8 wherein the first carriage assembly remains substantially stationary in the absence of low frequency actuation of the second carriage assembly.

14. A head positioning assembly comprising:
a base;
a first carriage assembly moveably disposed on the base;
a second carriage assembly having a recording head; and
first and second flexible members that are spaced apart from each other and extend from the first carriage assembly to the second carriage assembly; and
a motor that is directly coupled to the second carriage assembly for actuating the second carriage assembly;
wherein the first and second flexible members permit the second carriage assembly to move independently of the first carriage assembly and wherein the first carriage assembly moves in response to sufficient actuation of the second carriage assembly.

15. The head positioning assembly of claim 14 wherein the motor is disposed on the base.

16. The head positioning assembly of claim 14 wherein the first and second carriage assemblies are actuated simultaneously by the motor.

17. The head positioning assembly of claim 14 wherein the first and second flexible members at least partially isolate the first carriage assembly from high frequency vibrations in the second carriage assembly.

18. The head positioning assembly of claim 14 wherein the first and second flexible members have a planar configuration.

19. The head positioning assembly of claim 14 wherein the first and second flexible members permit movement of the second carriage assembly along a single axis.

20. The head positioning assembly of claim 14 further comprising a base and a set of bearings that permit movement of the first carriage assembly parallel to a direction in which the motor actuates the second carriage assembly.

* * * * *